(12) United States Patent
Shim

(10) Patent No.: US 10,184,634 B2
(45) Date of Patent: Jan. 22, 2019

(54) HEADLAMP INCLUDING MATRIX STATIC BENDING LIGHTS OPTICAL SYSTEM

(71) Applicant: Hyundai Mobis Co., Ltd., Seoul (KR)

(72) Inventor: Hyung Rok Shim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 15/498,427

(22) Filed: Apr. 26, 2017

(65) Prior Publication Data

US 2018/0106453 A1  Apr. 19, 2018

(30) Foreign Application Priority Data

Oct. 19, 2016 (KR) .......................... 10-2016-0135832

(51) Int. Cl.

| | |
|---|---|
| *F21S 41/36* | (2018.01) |
| *F21S 41/00* | (2018.01) |
| *F21S 43/00* | (2018.01) |
| *F21S 41/143* | (2018.01) |
| *F21S 41/19* | (2018.01) |
| *F21S 41/141* | (2018.01) |
| *F21S 45/47* | (2018.01) |
| *F21S 41/20* | (2018.01) |
| *B60Q 1/04* | (2006.01) |
| *F21S 41/33* | (2018.01) |
| *F21Y 115/10* | (2016.01) |

(52) U.S. Cl.
CPC ................ *F21S 41/36* (2018.01); *B60Q 1/04* (2013.01); *F21S 41/00* (2018.01); *F21S 41/141* (2018.01); *F21S 41/143* (2018.01); *F21S 41/192* (2018.01); *F21S 41/285* (2018.01); *F21S 43/00* (2018.01); *F21S 45/47* (2018.01); *F21S 41/336* (2018.01); *F21Y 2115/10* (2016.08)

(58) Field of Classification Search
CPC ...... F21S 41/06; F21S 41/141; F21S 48/1109; F21S 48/115; F21S 48/1225; F21S 48/1388; F21S 48/328
USPC ................ 362/517, 518, 543, 544, 545, 538
See application file for complete search history.

(56) References Cited

U.S. PATENT DOCUMENTS

| | | | |
|---|---|---|---|
| 2003/0035298 A1* | 2/2003 | Amano ................ | B60Q 1/2607 362/518 |
| 2003/0169600 A1* | 9/2003 | Amano ................ | B60Q 1/2696 362/545 |

(Continued)

*Primary Examiner* — Laura Tso
(74) *Attorney, Agent, or Firm* — H.C. Park & Associates, PLC

(57) ABSTRACT

A headlamp including a matrix static bending lights (SBL) optical system, which enables light to be turned on/off. The headlamp includes a headlamp body installed in a front region of a vehicle and including a main optical system for irradiating light, corresponding to one of a low beam headlight, a high beam headlight, and a glare free high beam (GFHB) headlight, onto the front of the vehicle, a reflective structure disposed on one side surface of the inside of a housing of the headlamp body with respect to a direction intersecting an installation reference direction of the main optical system and including a plurality of reflective surfaces, and a light source unit disposed apart from the reflective structure and including a plurality of light source chips that target at a reflective surface of the reflective structure and irradiate light onto the targeted reflective surface.

7 Claims, 11 Drawing Sheets

(56) References Cited

U.S. PATENT DOCUMENTS

2015/0336501 A1    11/2015  Desai et al.
2015/0369435 A1*  12/2015  Bauer .................. H05K 1/0295
                                                                     362/545

* cited by examiner

HEADLAMP INCLUDING MATRIX STATIC BENDING LIGHTS OPTICAL SYSTEM

CROSS-REFERENCE TO RELATED APPLICATION

This application claims priority from and the benefit of Korean Patent Application No. 10-2016-0135832, filed on Oct. 19, 2016, which is hereby incorporated by reference for all purposes as if set forth herein.

BACKGROUND

Field

The present disclosure relates to a headlamp including a matrix static bending lights (SBL) optical system, and more particularly, to a headlamp including a matrix SBL optical system, in which by applying a matrix emission function to an SBL, visibility for pedestrians next to a vehicle increases in the middle of stopping or driving of the vehicle including the SBL, and the safety of pedestrians is enhanced.

Discussion of the Background

Generally, vehicle headlights which are unit type headlights are installed in vehicles. The vehicle headlights are important lighting devices for vehicles.

For example, the vehicle headlights are lamp devices and may be ones of headlamps, tail lamps, fog lamps, and turn signal lamps.

The vehicle headlights installed on a left side and a right side of a front portion of vehicles illuminate the front in night driving and help safe driving of the vehicles.

With the advance of technology for the headlights, SBL has been developed.

The SBL may be a means for increasing visibility for pedestrians in a situation where a vehicle stops at a position such as an intersection or the like and pedestrians are crossing the street at a crosswalk next to the vehicle.

The SBL has some differences in comparison with dynamic bending lights (DBL).

The DBL is a means for securing the visibility of an oncoming vehicle or a vehicle which is driving on a curve road. The DBL passively changes an illumination state of light, based on a curve road.

In comparison with the DBL, when a slowly driving situation or a vehicle driving situation occurs at a position such as an intersection or the like, the SBL irradiates a lighting beam onto a side area (for example, a side area in front of a vehicle) onto which the DBL cannot irradiate a lighting beam. As a result, the SBL enhances the safety of pedestrians in a side area and prevents accidents of drivers of vehicles.

That is, the SBL may correspond to one of modes of an adaptive front lighting system (AFLS) or an adaptive driving module which irradiates light so as to enhance the safety of drivers and pedestrians.

Due to a lighting beam of the SBL, drivers which are driving vehicles at night can see persons, animals, or objects which are crossing the street at a crosswalk or which are on a walkway or a passageway.

As described above, the SBL is an auxiliary means for low beam headlights and can help the safe driving of drivers.

A related art headlight assembly with SBL has been disclosed in the following patent document.

The headlight assembly with SBL is installed in vehicles and includes a low beam headlight and a high beam headlight.

The headlight assembly with SBL includes a housing disposed between the high beam headlight and a center of a vehicle in a lengthwise direction. Here, the housing includes an inner wall, and an opening is provided in the inner wall with respect to a widthwise direction of the vehicle.

The headlight assembly with SBL includes an SBL. Here, the SBL turns on/off a lighting beam so as to illuminate a side area next to the vehicle through the opening, thereby enhancing side visibility.

However, a separate reflective surface and light source are needed for implementing a related art SBL. Particularly, the reflective surface for the related art SBL is configured to illuminate only a whole side area near the vehicle.

Moreover, the related art SBL is merely used to broadly diffuse light of the light source at a wide angle, and cannot selectively irradiate the light onto only a specific region of the whole side area.

As described above, the related art SBL has a lambertian reflectance which has the same outward brightness irrespective of an angle at which a driver (or an observer) looks at the periphery. Also, the related art SBL cannot selectively turn on/off a lighting beam for some areas. Therefore, the usability of the SBL is largely reduced.

For example, in order for a lighting beam of the related art SBL to be irradiated or not onto only some areas, a plurality of light sources and individual optical systems are needed. A lighting lamp configuration or a lighting lamp structure of each of the individual optical systems and the plurality of light sources is very complicated and is difficult to manufacture.

Even though a plurality of light sources are applied to the SBL for the individual turn-on/off of light, a lighting beam for a specific area or section cannot be turned on/off according to the individual turn-on/off of light. Also, total lights may be darkened or brightened according to the individual turn-on/off of light. Therefore, the usability of a lighting means that irradiates a lighting beam onto only a specific area is largely reduced.

Moreover, in the related art SBL, a light source and a reflective surface (for example, a reflective plate) should be installed in each of the individual optical systems. Therefore, the related art SBL can be very heavy. For this reason, the manufacturing of the related art SBL is very difficult, and the installation of the related art SBL is very inconvenient for users.

As a result, it is required to develop a module type device which is relatively miniaturized and integrated.

The above information disclosed in this Background section is only for enhancement of understanding of the background of the inventive concepts and, therefore, it may contain information that does not constitute prior art.

SUMMARY

Accordingly, the present disclosure provides a headlamp including a matrix SBL optical system, which includes one light source unit, where a plurality of light source chips (for example, a light-emitting diode (LED) and/or the like) are disposed at upper, lower, left, and right positions of a printed circuit board (PCB) and are spaced apart from each other, and one reflective structure which includes a plurality of reflective surfaces having a stepped structure in order for lighting beams of the light source chips to be irradiated onto different areas.

The present disclosure also provides a headlamp including a matrix SBL optical system, which enables each of light source chips of an SBL to be individually turned on/off, enables only a specific area to be clearly brightened by the individual turn-on of light or to be darkened by the individual turn-off of light, and realizes a matrix emission function compared with a lighting function based on a lambertian reflectance.

In one general aspect, a headlamp including a matrix static bending lights (SBL) optical system includes: a headlamp body installed in a front region of a vehicle, the headlamp body including a main optical system for irradiating light, corresponding to one of a low beam headlight, a high beam headlight, and a glare free high beam (GFHB) headlight, onto the front of the vehicle; a reflective structure disposed on one side surface of the inside of a housing of the headlamp body with respect to a direction intersecting an installation reference direction of the main optical system, the reflective structure including a plurality of reflective surfaces; and a light source unit disposed apart from the reflective structure, the light source unit including a plurality of light source chips that target at a reflective surface of the reflective structure and irradiate light onto the targeted reflective surface.

The reflective structure may include: a fixing plate provided in one end of the reflective structure, the fixing plate including a plurality of bolt holes and an installation guide hole; an extension plate vertically bent from the fixing plate; a first reflective surface protruding in a direction parallel to the fixing plate from an upper portion of an end of the extension plate, the first reflective surface being provided as a curved surface to reflect light of a first light source chip of the light source unit toward a first area in a side direction of the vehicle; a second reflective surface disposed adjacent to a portion under the first reflective surface to form a wave shape and provided as a curved surface to reflect light of a second light source chip of the light source unit toward a second area in the side direction of the vehicle, the second reflective surface protruding in a direction parallel to the fixing plate from a lower portion of the end of the extension plate; a first stepped surface extending in a direction from an outer end of the first reflective surface to a rear surface of the first reflective surface; a third reflective surface extending in a direction from an end of the first stepped surface to one end of the reflective structure, the third reflective surface being provided as a curved surface to reflect light of a third light source chip of the light source unit toward a third area in the side direction of the vehicle; a second stepped surface extending in a direction from an outer end of the second reflective surface to a rear surface of the second reflective surface; and a fourth reflective surface extending in a direction from an end of the second stepped surface to one end of the reflective structure, the fourth reflective surface being provided as a curved surface to reflect light of a fourth light source chip of the light source unit toward a fourth area in the side direction of the vehicle.

The reflective structure may further include a third stepped surface provided between the third reflective surface and the fourth reflective surface to form a stepped structure having a cross type.

The light source unit may include: a connector electrically connected to the headlamp body; and a printed circuit board (PCB) including a plurality of board installation holes, the connector being installed in the PCB. The first light source chip, the second light source chip, the third light source chip, and the fourth light source chip may be spaced apart from each other and may be respectively installed in upper, lower, left, and right points of the PCB to irradiate light in a diagonal direction with respect to the first reflective surface, the second reflective surface, the third reflective surface, and the fourth reflective surface.

The light source unit may include: a bracket floor, the PCB being installed on the bracket floor; a guide partition wall provided to be integrated with a front portion of the bracket floor to support a side surface of the PCB disposed in the front portion of the bracket floor; a plurality of heat dissipation pins provided in a rear surface of the bracket floor; a bracket supporting part bent to be integrated with the bracket floor from an end of the bracket floor; a through hole provided in the bracket supporting part facing the connector of the PCB; and an accommodating groove provided in an end of the bracket supporting part to support the fixing plate and the extension plate of the reflective structure at a position spaced apart from the through hole.

The headlamp body may include a bezel disposed at a front position of the reflective structure for preventing light, reflected from one of first to fourth reflective surfaces of the reflective structure, from being diffused in a front direction of the headlamp body.

The plurality of light source chips of the light source unit may each include a light-emitting diode (LED) supplied with power through the connector and the PCB.

Other features and aspects will be apparent from the following detailed description, the drawings, and the claims.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the inventive concepts and are incorporated in and constitute a part of this specification, illustrate exemplary embodiments of the inventive concepts, and together with the description serve to explain the principles of the inventive concepts.

FIG. 8A is a graph showing a light distribution state when four light source chips of the light source unit illustrated in FIG. 5 are all turned on.

DETAILED DESCRIPTION OF THE ILLUSTRATED EMBODIMENTS

Figure 1:
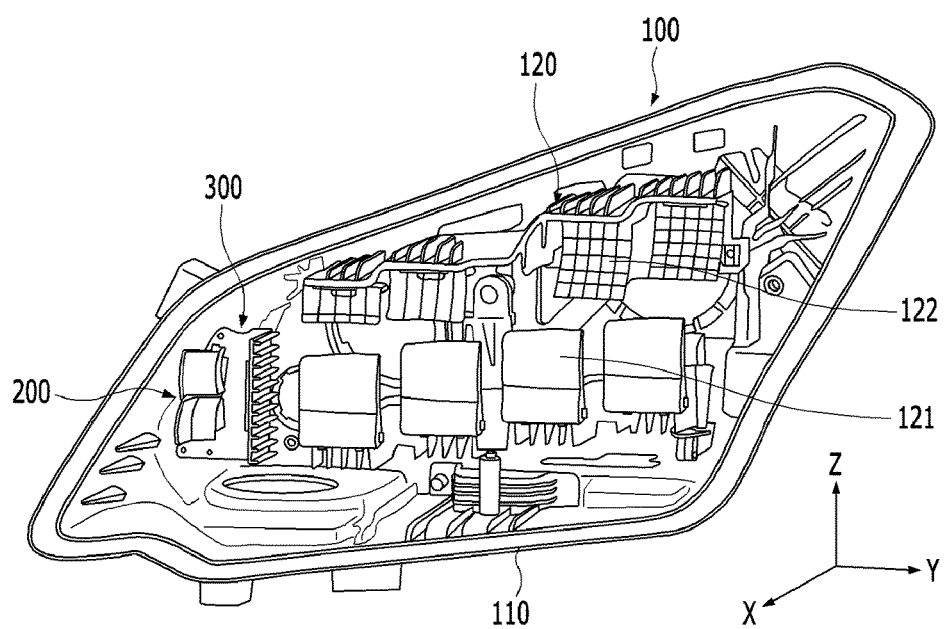
FIG. 1 is a whole perspective view of a headlamp including a matrix SBL optical system according to an exemplary embodiment of the inventive concepts.

The inventive concepts are described more fully hereinafter with reference to the accompanying drawings, in which exemplary embodiments of the inventive concepts are shown. These inventive concepts may, however, be embodied in many different forms and should not be construed as limited to the embodiments set forth herein. Rather, these embodiments are provided so that this disclosure is thorough, and will fully convey the scope of the inventive concepts to those skilled in the art. In the drawings, the size and relative sizes of layers and regions may be exaggerated for clarity. Like reference numerals in the drawings denote like elements.

Various advantages and features of the inventive concepts and methods accomplishing thereof will become apparent from the following description of embodiments with reference to the accompanying drawings. However, the inventive concepts are not be limited to the exemplary embodiments set forth herein but may be implemented in many different forms. The present exemplary embodiments may be provided so that the disclosure of the inventive concepts will be complete, and will fully convey the scope of the inventive concepts to those skilled in the art and therefore the inventive concepts will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. Unless particularly described to the contrary, the term "comprise", "configure", "have", or the like, which are described herein, will be understood to imply the inclusion of the stated components, and therefore should be construed as including other components, and not the exclusion of any other elements. As used herein, the singular forms "a," "an" and "the" are intended to include the plural forms as well, unless the context clearly indicates otherwise. Hereinafter, embodiments of the present invention will be described in detail with reference to the accompanying drawings.

Figure 2:
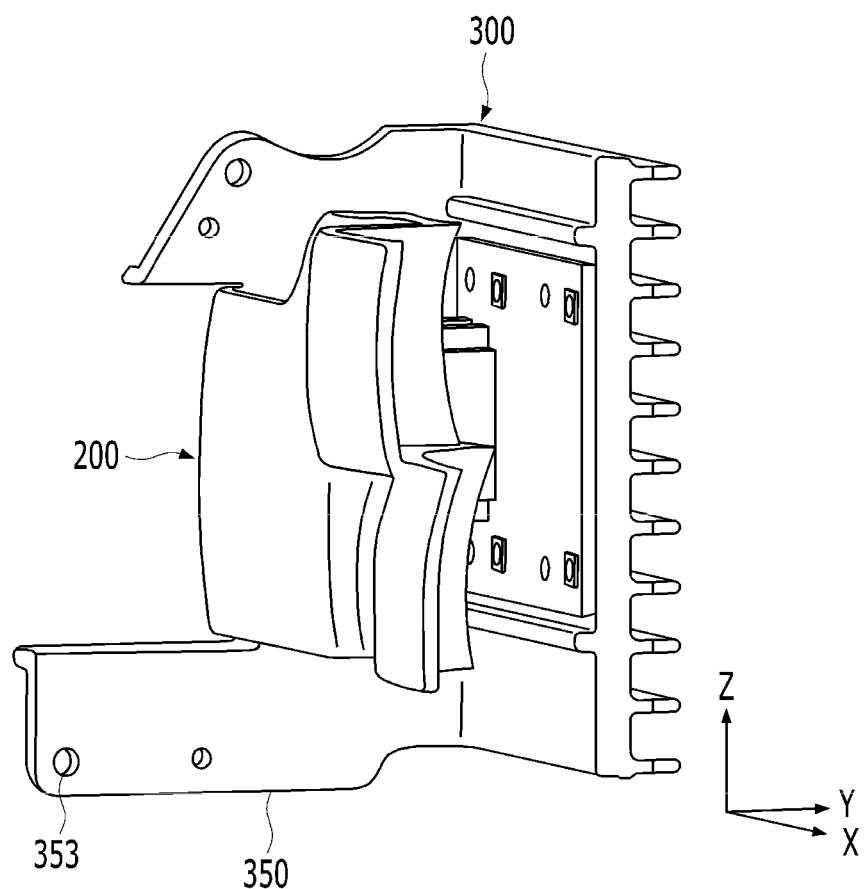
FIG. 2 is a perspective view illustrating a light source unit and a reflective structure which are coupled to each other and mounted on the headlamp of FIG. 1.

FIG. 1 is a whole perspective view of a headlamp including a matrix SBL optical system according to an exemplary embodiment of the inventive concepts, and FIG. 2 is a perspective view illustrating a light source unit and a reflective structure which are coupled to each other and mounted on the headlamp of FIG. 1.

Referring to FIG. 1, according to the present exemplary embodiment, a headlamp body 100, one reflective structure 200, and one light source unit 300 may be provided.

The one reflective structure 200 may be provided as a single type body.

The headlamp body 100 may include a housing 110. Here, a front portion of the housing 110 may be opened. The housing 110 may be a kind of injection molding element.

The headlamp 100 may include a main optical system 120 installed inside the housing 110. Also, the headlamp 100 may include an outer lens (not shown) including a transparent material. The outer lens may surround the opened front portion of the housing 110.

The main optical system 120 may be installed in a front portion of a vehicle (for example, both corners of the front portion of the vehicle).

The main optical system 120 may include a plurality of lamp devices 121 for irradiating light, corresponding to one of a low beam headlight, a high beam headlight, and a glare free high beam (GFHB) headlight, onto the front of the vehicle and a reflector member 122 that reflects light emitted from each of the plurality of lamp devices 121.

The main optical system 120 may be installed with respect to an X-axis direction which is an installation reference direction of the main optical system 120.

The reflective structure 200 and the light source unit 300 may be installed inside the headlamp body 100, namely, inside the housing 110.

Each of the reflective structure 200 and the light source unit 300 may act as an SBL that irradiates light onto a pedestrian located next to the vehicle.

The reflective structure 200 may be disposed or installed on one side surface of the inside of the housing 110 of the headlamp body 100 with respect to a direction (for example, a Y-axis direction) intersecting the installation reference direction (for example, the X-axis direction) of the main optical system 120.

The reflective structure 200 may include a plurality of reflective surfaces for performing a matrix emission function, based on the matrix SBL optical system. In the matrix emission function, a matrix may denote an individual light turn-on/off pattern.

The one side surface of the inside of the housing 110 of the headlamp body 100 may include a stepped-type installation surface. An outer surface of a bracket supporting part 350 of the light source unit 300 illustrated in FIG. 2 may be closely adhered to the stepped-type installation surface of the one side surface of the inside of the housing 110. Also, a mounting bolt (not shown) may be coupled to the stepped-type installation surface of the one side surface of the inside of the housing 110 through an installation hole 353 of the bracket supporting part 350, and thus, the light source unit 300 may be installed or disposed on the one side surface of the inside of the housing 110.

Figure 3:
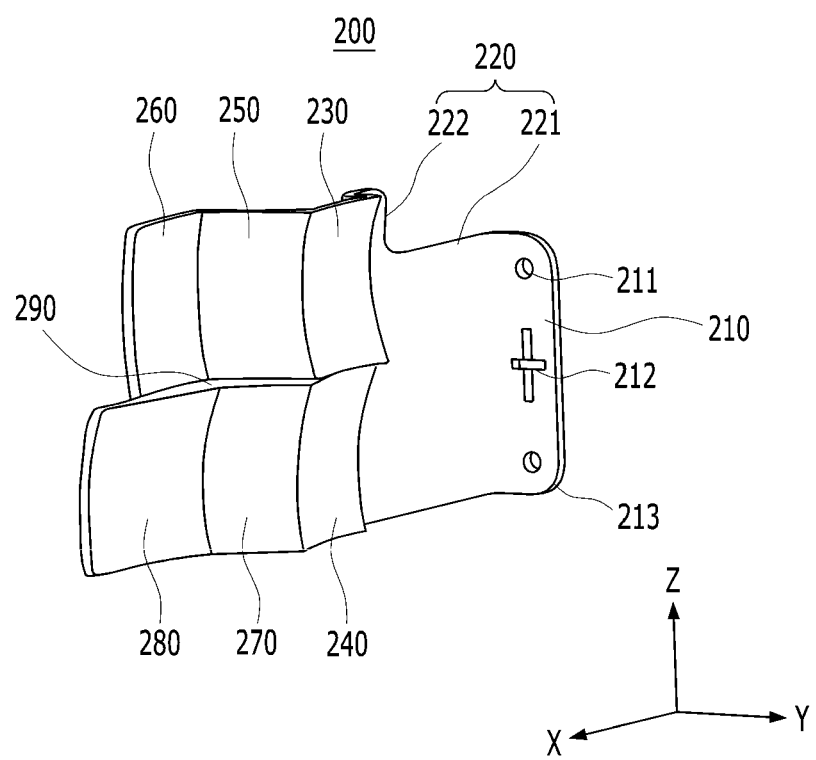
FIG. 3 is a perspective view of the reflective structure illustrated in FIG. 2.

Referring to FIG. 2 and FIG. 3, the light source unit 300 may be coupled to a fixing plate 210 of the reflective structure 200. Therefore, the reflective structure 200 may be supported to the one side surface of the inside of the housing 110 through the light source unit 300.

The light source unit 300 may include a plurality of light source chips which are disposed apart from the reflective structure 200. Here, each of the light source chips may target at the reflective surface of the reflective structure 200 and may irradiate light thereon.

For example, each of the light source chips of the light source unit 300 may be configured with a chip type LED that emits light with power supplied through a PCB and a connector of the light source unit 300.

The reflective structure 200 and the light source unit 300 may perform one of the whole turn-on of light, the whole turn-off of light, the individual turn-on of light, and the individual turn-off of light.

The reflective structure 200 and the light source unit 300 solve the problem of the related art where total light is darkened or brightened when turning on/off a lighting beam.

Figure 8A:
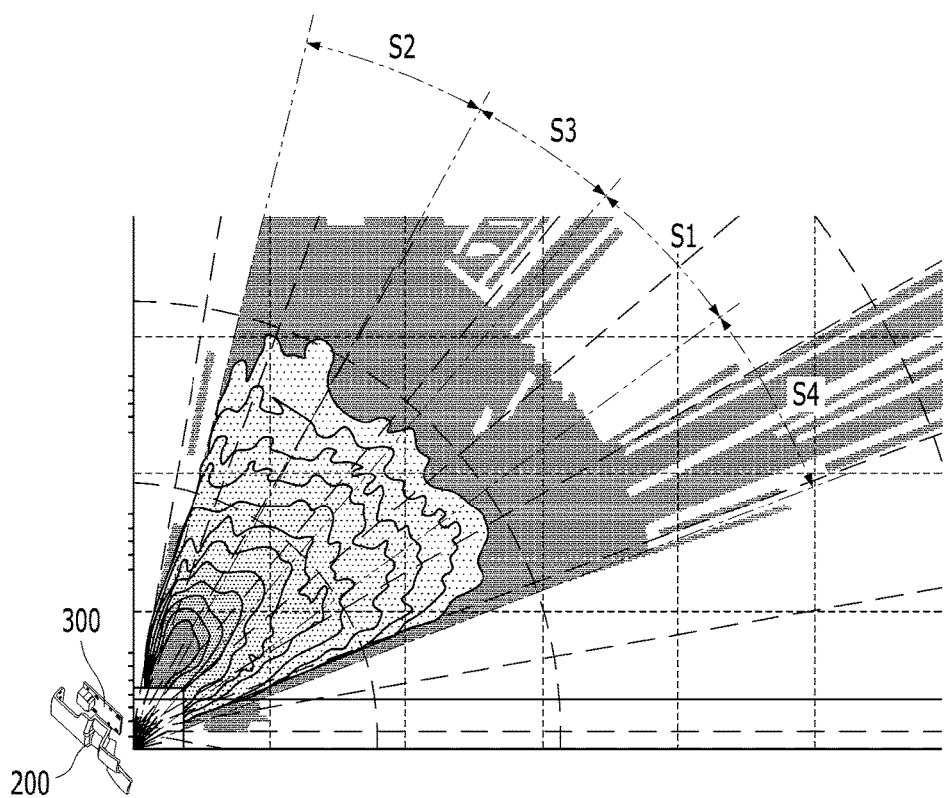
Figure 8B:
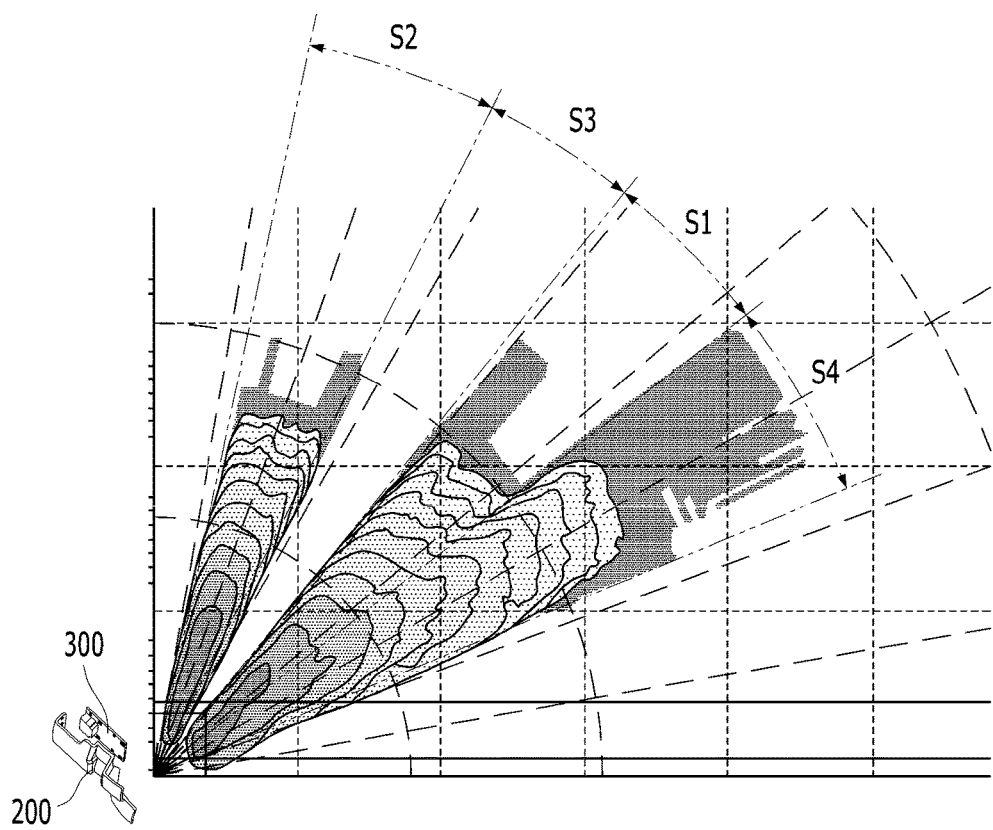
FIG. 8B is a graph showing a light distribution state when one of the four light source chips illustrated in FIG. 8A is turned off.

A lighting beam generated by the reflective structure 200 and the light source unit 300 may reach a plurality of SBL areas S1 to S4 (as shown in FIG. 8A and FIG. 8B).

Referring to FIG. 8A and FIG. 8B, the SBL areas S1 to S4 may be divided into a plurality areas (for example, four areas), and for example, may include a first area S1, a second area S2, a third area S3, and a fourth area S4. Here, the first to fourth areas S1 to S4 may be adjacent to each other, and thus, may denote a specific area including all of the SBL areas S1 to S4.

The reflective structure 200 and the light source unit 300 may be configured to realize the matrix emission function of individually irradiating light to each of the first to fourth areas S1 to S4.

Referring to FIG. 2, the reflective structure 200 may realize the matrix emission function and may be provided in an integration type. The reflective structure 200 may be coupled to the below-described light source unit 300 to realize the matrix SBL optical system.

Figure 4:
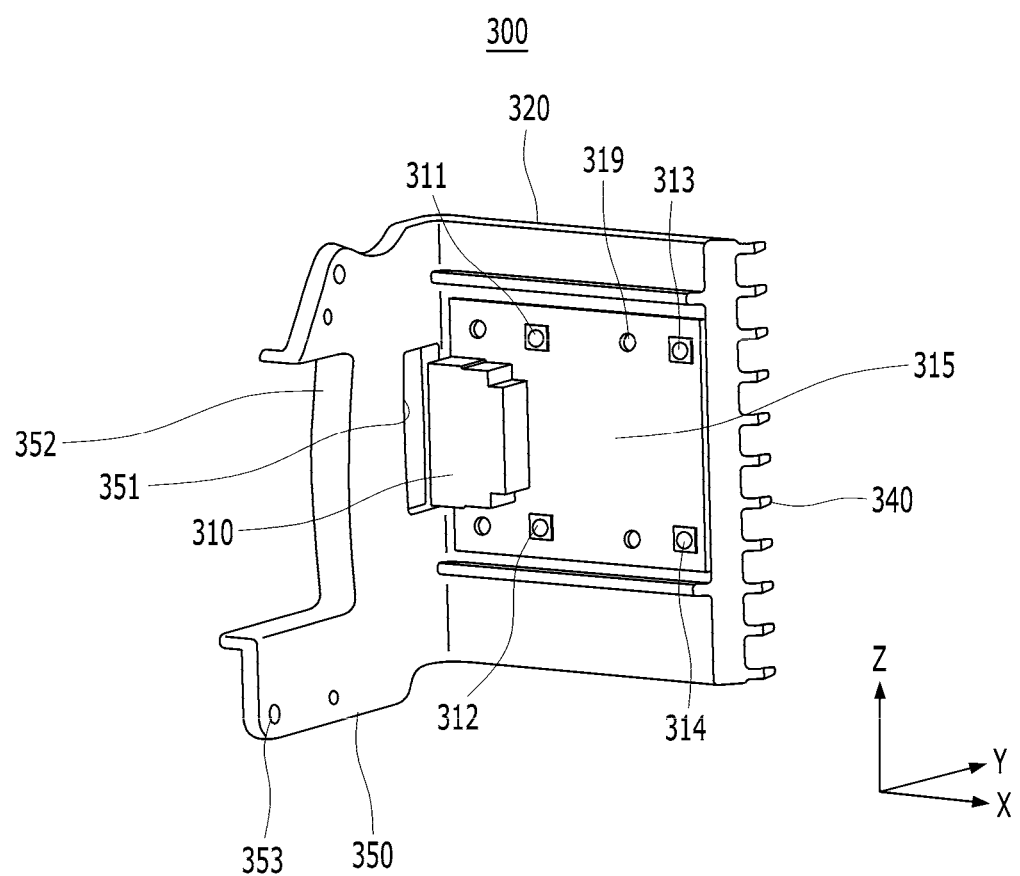
FIG. 4 is a perspective view of the light source unit illustrated in FIG. 2.

FIG. 3 is a perspective view of the reflective structure 200 illustrated in FIG. 2, and FIG. 4 is a perspective view of the light source unit 300 illustrated in FIG. 2.

Referring to FIG. 3, the reflective structure 200 may include the fixing plate 210, an extension plate 220, a first reflective surface 230, a second reflective surface 240, a first stepped surface 250, a third reflective surface 260, a second stepped surface 270, a fourth reflective surface 280, and a third stepped surface 290 which are provided to be integrated through injection molding.

The fixing plate 210 may include a plurality of bolt holes 211 and an installation guide hole 212 having a cross structure.

The plurality of bolt holes 211 may each be provided in one end of the reflective structure 200 and may pass through the fixing plate 210 in a thickness direction from an upper side to a lower side of the fixing plate 210.

The installation guide hole 212 may pass through the fixing plate 210 in the thickness direction of the fixing plate 210 with respect to a position between the bolt holes 211.

The fixing plate 210, a smooth plate member, may include a round-shaped corner 213.

The extension plate 220 may be vertically bent from the fixing plate 210 with respect to an opposite side of the round-shaped corner 213.

The extension plate 220 may be provided in a curved shape. The extension plate 220 may include an extension area 222 which relatively further extends than a connecting part 221 connected to the fixing plate 210, based on an area of each of the below-described reflective surfaces 230, 240, 260, and 280.

Moreover, a material and a stacked structure of the reflective surfaces 230, 240, 260, and 280 may be the same as or similar to a configuration of a general reflector for vehicles, and thus, are not limited to a specific material or stacked structure.

Referring to FIGS. 3 and 4, the first reflective surface 230 may protrude in a direction parallel to the fixing plate 210 from an upper end of the extension plate 220 corresponding to the extension area 222. The first reflective surface 230 may be provided as a curved surface so as to reflect light of the first light source chip 311 of the light source unit 300 illustrated in FIG. 4 toward the first area S1 in a side direction of the vehicle.

With respect to FIG. 3, the second reflective surface 240 may be disposed adjacent to a portion under the first reflective surface 230 so as to form a wave shape and may protrude in a direction parallel to the fixing plate 210 from a lower end of the extension plate 220. The second reflective surface 240 may be provided as a curved surface so as to reflect light of the second light source chip 312 of the light source unit 300 toward the second area S2 (see FIG. 9) in the side direction of the vehicle.

The first stepped surface 250 may extend in a direction from an outer end of the first reflective surface 230 to a rear surface of the first reflective surface 230.

The third reflective surface 260 may extend in a direction from an end of the first stepped surface 250 to the other end of the reflective structure 200 and may be provided as a curved surface so as to reflect light of the third light source chip 313 of the light source unit 300 toward the third area S3 in the side direction of the vehicle.

The first stepped surface 250 may enable the below-described third reflective surface 260 to be disposed in a stepped structure, based on a direction of light emitted from the first light source chip 311. That is, the first stepped surface 250 may correspond to an inclined surface connected between the first reflective surface 230 and the third reflective surface 260 or may perform a function of controlling a light distribution. Here, the light distribution may show the amount of light which is distributed in a specific direction when controlling the light. That is, the light distribution may denote a luminous intensity distribution in each direction of a light source or may denote a spatial distribution of luminous intensity which varies according to a direction of light.

That is, the first stepped surface 250 may allow light emitted from the first light source chip 311 to be reflected to the first reflective surface 230 and may control the light distribution in order for the light not be irradiated onto the third reflective surface 260.

The reflective structure 200 may realize the matrix emission function due to the first stepped surface 250. The matrix emission function may denote a function that enables the turn-on of light or the turn-off of light to be clearly distinguished through the control of a light distribution.

The second stepped surface 270 may extend in a direction from an outer end of the second reflective surface 240 to a rear surface of the second reflective surface 240 so as to realize the matrix emission function similar to the first stepped surface 250 described above.

The fourth reflective surface 280 may extend in a direction from an end of the second stepped surface 270 to the other end of the reflective structure 200 and may be provided as a curved surface so as to reflect light of the fourth light source chip 314 of the light source unit 300 toward the fourth area S4 in the side direction of the vehicle.

Here, an outer end (for example, a free end) of the fourth reflective surface 280 may protrude further than an outer end of the third reflective surface 260.

Therefore, the outer end of the fourth reflective surface 280 and the outer end of the third reflective surface 260 may have a stepped structure on an X-Z plane of FIG. 3. Also, the outer end of the fourth reflective surface 280 and the outer end of the third reflective surface 260 may correspond to the other end of the reflective structure 200.

Figure 9:
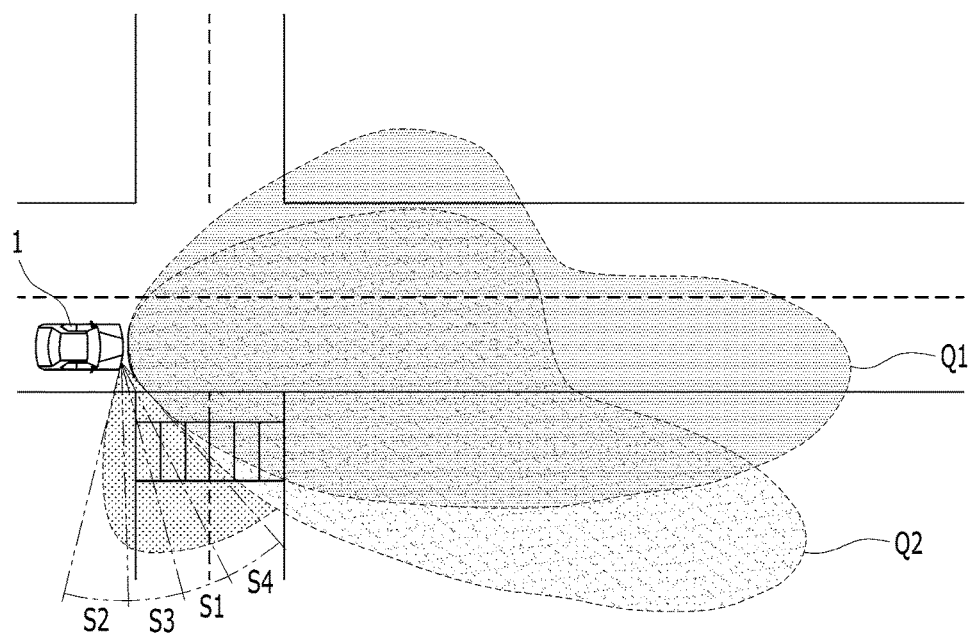
FIG. 9 is a plan view for describing an operation of a headlamp including a matrix SBL optical system according to an exemplary embodiment of the inventive concepts.

Moreover, a curve slope, an area, or a light distribution direction of each of the first to fourth reflective surfaces 230, 240, 260, and 280 may be designed to correspond to each of the first to fourth areas S1 to S4 illustrated in FIGS. 8A, 8B, and 9, and thus, is not limited to a specific numerical value and a shape.

Here, the third stepped surface 290 may be provided between the third reflective surface 260 and the fourth reflective surface 280 so as to form a stepped structure having a cross type.

Figure 5:
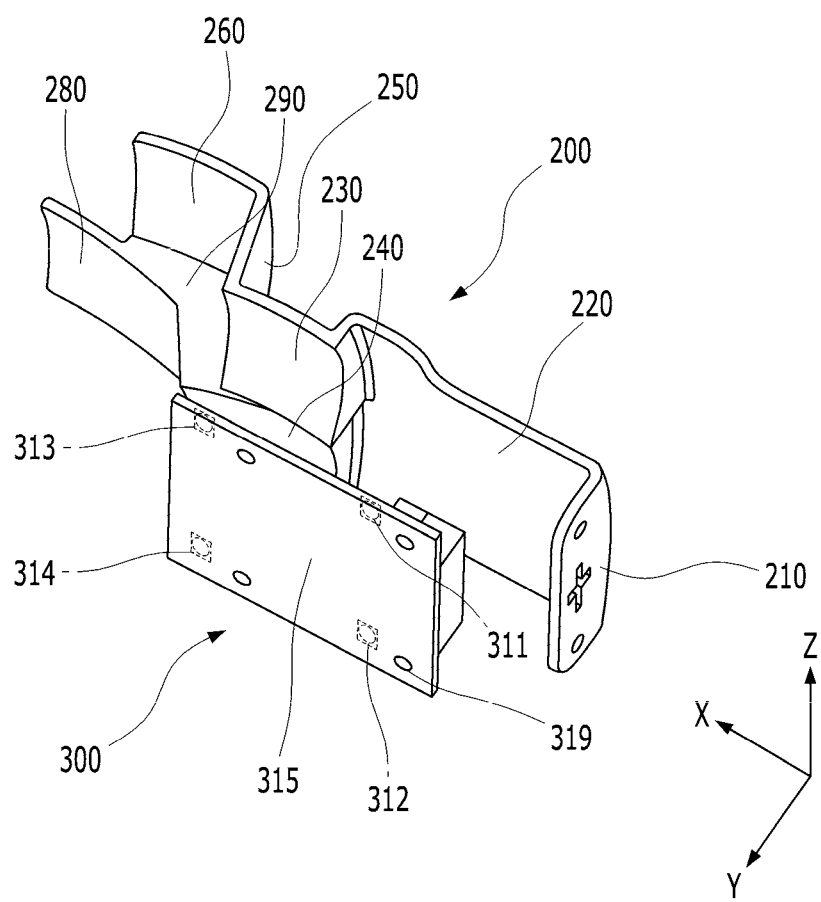
FIG. 5 is a perspective view for describing a stepped structure of the light source unit and the reflective structure illustrated in FIG. 2.

Moreover, as illustrated in FIG. 5, the third stepped surface 290 may be provided in an L-shape with respect to an X-Y plane.

Moreover, it may be assumed that in the X-Y plane, a region where the light source unit 300 is disposed is a front region, and thus, a region where the reflective structure 200 is disposed is a rear region. In this case, one side of the third stepped surface 290 may be connected to the fourth reflective surface 280, and the fourth reflective surface 280 may be disposed in the front region. Also, the other side of the third stepped surface 290 may be connected to the third reflective surface 260, and the third reflective surface 260 may be disposed in the rear region.

In this case, the third stepped surface 290 may be a boundary between a corner position of the third reflective surface 260 and the first stepped surface 250 and a corner position of the fourth reflective surface 280 and the second stepped surface 270. When the third stepped surface 290 is provided and disposed, interference does not occur between lights which are respectively irradiated onto the third reflective surface 260 and the fourth reflective surface 280, and thus, each of the lights does not affect a light distribution of the other light.

Referring to FIGS. 3 and 4, a width of the fixing plate 210 of the reflective structure 200 and a width of an accommodating groove 352 of the light source unit 300 may be equally designed based on an assembly tolerance. That is, the fixing plate 210 of the reflective structure 200 may be fitted into the accommodating groove 352 of the light source unit 300. In this case, the fixing plate 210 of the reflective structure 200 may overlap a peripheral portion of the accommodating groove 352 of the light source unit 300. In this case, the bolt holes 211 of the fixing plate 210 may match an internal diameter (not shown) of a bolt fixing part 354 (see FIG. 6) which is provided near the accommodating groove 352 of the light source unit 300. Subsequently, a coupling bolt (not shown) may be fastened into the internal diameter of the bolt fixing part 354 near the accommodating groove 352 of the light source unit 300 through the bolt holes 211 of the fixing plate 210, and thus, the light source unit 300 and the reflective structure 200 may be coupled to each other.

Referring again to FIG. 4, the light source unit 300 may include a connector 310 electrically connected to the above-described headlamp body and a PCB 315 on which the connector 310 is installed or mounted in order for electricity to flow and which includes a plurality of board installation holes. A light turn-on/off driving circuit (not shown) for controlling the turn-on/off of the first to fourth light source chips 311 to 314 may be further provided on the PCB 315.

In the present embodiment, for convenience of description, the light source chip is described as including the first to fourth light source chips 311 to 314, but may be provided as two or more or in plurality.

Moreover, the first to fourth light source chips 311 to 314 may be arranged apart from each other with respect to upper, lower, left, and right points of an X-Z plane of the PCB 315, and thus, interference does not physically occur between lights emitted from the respective light source chips.

For example, if a width of each of the light source chips is 0.5 cm, a separation distance between the light source chips in a Z-axis direction or an X-axis direction or a diagonal distance on the X-Z plane may have a numerical value corresponding to seven to ten times the width of each of the light source chips.

FIG. 5 is a perspective view for describing a stepped structure of the light source unit 300 and the reflective structure 200 illustrated in FIG. 2.

Referring to FIGS. 4 and 5, the first to fourth light source chips 311 to 314 may be mounted on a plane of the PCB 315 facing the reflective structure 200 by using four corners of the PCB 315.

In this case, the first reflective surface 230 of the reflective structure 200 may be disposed to target at or match the first light source chip 311 which is spaced apart from the first reflective surface 230 in an inclined direction. In this way, the second reflective surface 240 may be disposed to target at or match the second light source chip 312 which is spaced apart from the second reflective surface 240 in an inclined direction, the third reflective surface 260 may be disposed to target at or match the third light source chip 313 which is spaced apart from the third reflective surface 260 in an inclined direction, and the fourth reflective surface 280 may be disposed to target at or match the fourth light source chip 314 which is spaced apart from the fourth reflective surface 280 in an inclined direction.

The targeting or the matching may denote that light emitted from each of the light source chips 311 to 314 is reflected to a corresponding reflective surface of the reflective surfaces 230, 240, 260, and 280 which are arranged in a three-dimensional stepped structure.

Figure 6:
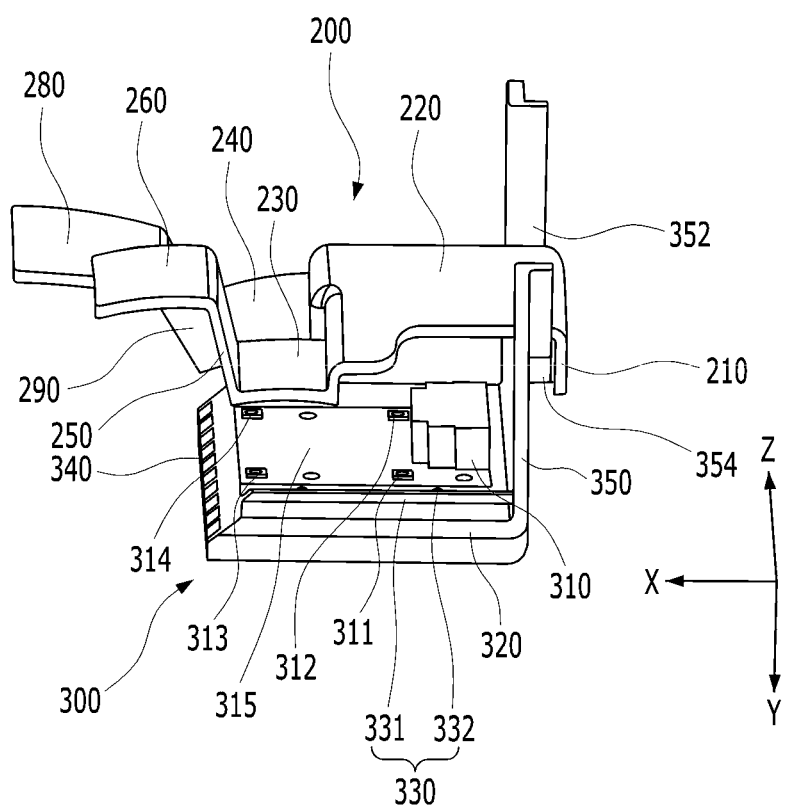
FIG. 6 is a perspective view illustrating a side surface of a coupling body including the light source unit and the reflective structure illustrated in FIG. 2.
Figure 7:
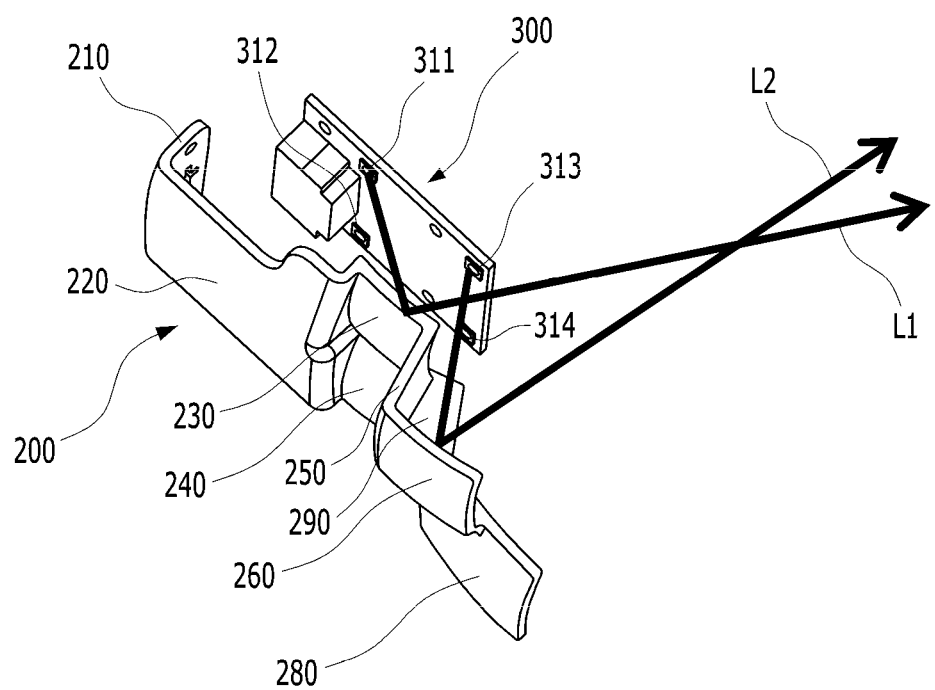
FIG. 7 is a perspective view for describing operations of the light source unit and the reflective structure illustrated in FIG. 5.

FIG. 6 is a perspective view illustrating a side surface of a coupling body including the light source unit and the reflective structure illustrated in FIG. 2. FIG. 7 is a perspective view for describing operations of the light source unit and the reflective structure illustrated in FIG. 5.

Referring to FIG. 6 or 7, the first light source chip 311, the second light source chip 312, the third light source chip 313, and the fourth light source chip 314 may be spaced apart from each other and may be respectively installed in the upper, lower, left, and right points (for example, four corners) of the PCB 315 in a one-to-one relationship (1:1), namely, so as to irradiate light in a diagonal direction with respect to the first reflective surface 230, the second reflective surface 240, the third reflective surface 260, and the fourth reflective surface 280.

For example, referring to directions of light axes L1 and L2 of lights illustrated in FIG. 7, the light axis L1 of light emitted from the first light source chip 311 may be reflected to only the first reflective surface 230, and thus, may be irradiated onto the first area S1 illustrated in FIG. 9. In this case, since the light axis L1 of the light emitted from the first light source chip 311 is reflected to the first reflective surface 230 but is not irradiated onto the third light source chip 313, the light of the first light source chip 311 does not affect a light distribution of the third light source chip 313.

This is because the light axis L1 of the light irradiated onto the first reflective surface 230 does not travel to the third reflective surface 260 due to the first stepped surface 250 having a stepped structure. Also, the light axis L2 of light emitted from the third light source chip 313 may be designed to travel to the third reflective surface 260.

Moreover, a light axis (not shown) of the second or fourth light source chip 312 or 314 may be defined based on a design method using stepped surfaces relevant to a corresponding light source chip similarly to a design method of the light axes L1 and L2.

For example, a light distribution of each of the third and fourth light source chips 313 and 314 is not affected by the third stepped surface 290.

Particularly, referring again to FIG. 6 or 4, the light source unit 300 may include a bracket floor 320 on which the PCB 315 is installed and a guide partition wall 330 which is provided to be integrated with a front portion of the bracket floor 320 to support a side surface of the PCB 315 disposed in the front portion of the bracket floor 320.

Here, the PCB 315 may be coupled to or installed on the bracket floor 320 through a fastening bolt (not shown) coupled to a plurality of installation holes 319 which are provided in a board thickness direction and are disposed in a board plane direction.

Moreover, the guide partition wall 330 may include a main partition wall 331 having a straight shape and a plurality of partition wall projections 332 which protrude in a direction from the main partition wall 331 to a side surface of the PCB 315.

The guide partition wall 330 may partially support a side surface of the PCB 315 by using the partition wall projections 332.

A side surface of the guide partition wall 330 except the partition wall projections 332 may be spaced apart from a side surface of the PCB 315 corresponding thereto.

For this reason, a problem of heat occurring in the PCB 315 is solved. The heat dissipation performance of each of the guide partition wall 330 and the partition wall projections 332 is enhanced.

The PCB 315 is relatively easily installed on the bracket floor 320 by the guide partition wall 330 and the partition wall projections 332.

The light source unit 300 may include a plurality of heat dissipation pins 340 that exchange heat, occurring in the PCB 315, with heat in air. The plurality of heat dissipation pins 340 may be provided on a rear surface of the bracket floor 320.

The light source unit 300 may include the bracket supporting part 350 which is bent from an end of the bracket floor 320 in an integration type.

The light source unit 300 may include a through hole 351 which is provided in the bracket supporting part 350 facing the connector 310 of the PCB 315.

The light source unit 300 may include the accommodating groove 352 which is provided in an end of the bracket supporting part 350. Here, the accommodating groove 352 may be a portion where the fixing plate 210 and the extension plate 220 of the reflective structure 200 are coupled to each other at a position spaced apart from the through hole 351, and may support the fixing plate 210 and the extension plate 220 after the coupling.

FIG. 8A is a graph showing a light distribution state when four light source chips of the light source unit illustrated in FIG. 5 are all turned on. FIG. 8B is a graph showing a light distribution state when one of the four light source chips illustrated in FIG. 8A is turned off. FIG. 9 is a plan view for describing an operation of a headlamp including a matrix SBL optical system according to an exemplary embodiment of the inventive concepts.

Referring to FIG. 8A, it can be seen that when the four light source chips are all turned on by the reflective structure 200 and the light source unit 300, a light distribution is made in all of the areas S1 to S4.

Referring to FIG. 8B, it can be seen that when three of the four light source chips are turned on and the other one light source chip (i.e., the third light source chip) is turned off, light is clearly turned off in only the third area S3 corresponding to the third light source chip, and a light distribution is made in the other areas S1, S2, and S4.

As described above, in the present embodiment, since all or some of the four light source chips are selectively turned on/off in the above-described method, the matrix emission function for controlling a light distribution for each of the areas S1 to S4 is completely realized.

Moreover, in the present embodiment, an effect such as a plurality of optical system modules being provided is obtained by merely turning on/off each of the light source chips, and the individual turn-on/off of light is realized.

Moreover, in the present embodiment, although not shown, a separate primary optics (not shown) having a light collecting structure may be disposed in a portion (i.e., a front position of each of the light source chips) which emits light in each of the light source chips. Here, the primary optics may be a total reflection structure or a lens that collects light emitted from an LED.

Referring to FIG. 9, a vehicle 1 may stop at a crossroad having a crosswalk in the middle of driving. In this case, light irradiated onto a road surface in front of the vehicle 1 may generate main irradiation areas Q1 and Q2 on the road surface by using one of a low beam headlight, a high beam headlight, and a GFHB headlight in a main optical system of a headlamp body of the vehicle 1.

However, a side area other than the main irradiation areas Q1 and Q2 may be a crosswalk area close to the vehicle 1. The side area other than the main irradiation areas Q1 and Q2 may be a blind spot. In the blind spot, light emitted from the main optical system of the vehicle 1 cannot reach the main irradiation areas Q1 and Q2.

However, a lighting beam such as matrix SBL generated by the reflective structure and the light source unit according to the present embodiment may be irradiated onto the side area.

Particularly, the lighting beam such as the matrix SBL realizes the matrix emission function unlike the related art, and thus, the side area may be divided into the four areas S1 to S4, thereby selectively turning on/off light.

To provide an additional description, an individual specific area such as one of the four areas S1 to S4 may be wholly brightened or darkened based on the matrix emission function.

Moreover, all of the fourth areas S1 to S4 may be brightened or darkened by areas or partially, based on the matrix emission function.

Figure 10:
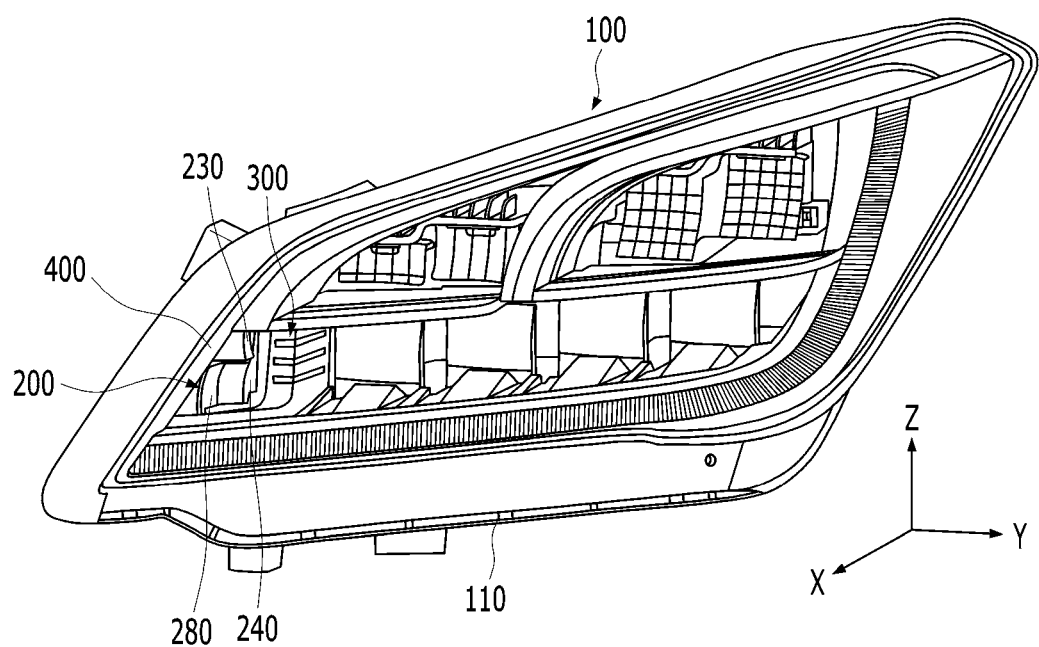
FIG. 10 is a whole perspective view of a headlamp including a matrix SBL optical system according to an exemplary embodiment of the inventive concepts.

FIG. 10 is a whole perspective view of a headlamp including a matrix SBL optical system according to an exemplary embodiment of the inventive concepts.

Referring to FIG. 10 along with FIG. 1, in a headlamp body 100 according to the exemplary embodiment of the inventive concepts, a first reflective surface 230 and a third reflective surface 260 of the reflective structure 200 may correspond to a first layer of the reflective structure 200.

In comparison with the first layer, a second reflective surface 240 and a fourth reflective surface 280 may correspond to a second layer of the reflective structure 200 that irradiates light onto another area. That is, two reflective surfaces may be paired with each other per one layer.

As described above in the present embodiment or the application embodiment, the reflective structure 200 has been described as including two layers, but a layer of the reflective structure 200 may be provided as two or more through a modification of a design.

In this case, the headlamp body 100 may include a bezel 400. Here, the bezel 400 prevents light, reflected from one of first to fourth reflective surfaces 230, 240, 260, and 280 of the reflective structure 200, from being diffused in a front direction of the headlamp body 100.

For example, the bezel 400 may be disposed at a front position of the reflective structure 200. In this case, the bezel 400 may be provided to extend along a border of a housing 110 of the headlamp body 100 with respect to an inner position of an outer lens (not shown). One side of the bezel 400 may be coupled to the border of the housing 110 of the headlamp body 100. Also, the other side of the bezel 400 may be a free end and may guide the light, reflected from one of first to fourth reflective surfaces 230, 240, 260, and 280 of the reflective structure 200, to be irradiated in a direction toward a side surface of a vehicle.

The bezel 400 may be manufactured as a three-dimensional type along an X-axis direction, a Y-axis direction, and a Z-axis direction.

The bezel 400 may occlude light, traveling in the X-axis direction, of lights irradiated from the reflective structure 200 and may prevent external light from traveling to the reflective structure along the X-axis direction.

Light reflected to a reflective surface (for example, the first reflective surface 230 or the second reflective surface 240) disposed in the Z-axis direction may also be blocked by the bezel 400, and thus, does not affect a light distribution.

The headlamp including the matrix SBL optical system according to the exemplary embodiments of the inventive concepts may include one light source unit including a plurality of light source chips (for example, LEDs) and one reflective structure which is disposed apart from a position of the light source unit along an inclined direction, and thus, the matrix SBL optical system is easily installed in a conventional headlamp body.

Moreover, in the headlamp including the matrix SBL optical system according to the exemplary embodiments of the inventive concepts, since two reflective surfaces are paired with each and have a stepped structure due to a stepped surface, each of the reflective surfaces may be disposed to target at each of the light source chips, and thus, lighting beams of the light source chips may be irradiated onto different areas, and each of the light beams for the different areas may be individually turned on/off.

Moreover, the headlamp including the matrix SBL optical system according to the exemplary embodiments of the inventive concepts has a feature which differs from the related art where a separate reflective surface and light source are used for implementing the SBL.

That is, since the headlamp including the matrix SBL optical system according to the exemplary embodiments of the inventive concepts is a simple-structure lamp device which includes one reflective structure and one light source unit including a plurality of reflective surfaces in order for each of lighting beams for four areas to be individually turned on/off, the number of elements of the headlamp including the matrix SBL optical system is relatively reduced.

A design of the headlamp including the matrix SBL optical system according to the exemplary embodiments of the inventive concepts is simplified, and the manufacturing cost of the headlamp is reduced.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A headlamp with a matrix static bending lights (SBL) optical system, the headlamp comprising:
  a headlamp body;
  a reflective structure; and
  a light source unit;
  wherein the headlamp body is installed in a front region of a vehicle, the headlamp body further comprising a main optical system for irradiating light, corresponding to one of a low beam headlight, a high beam headlight, and a glare free high beam (GFHB) headlight, wherein the headlamp body further comprises a housing;
  the reflective structure is disposed on one side surface of an inside of the housing with respect to a direction intersecting an installation reference direction of the main optical system, the reflective structure further comprises a plurality of reflective surfaces;
  the light source unit is disposed apart from the reflective structure, the light source unit further comprises a plurality of light source chips that target at each of the plurality of reflective surfaces of the reflective structure and irradiate light onto each of the plurality of reflective surfaces;
  a fixing plate provided in one end of the reflective structure, the fixing plate further comprises a plurality of bold holes and an installation guide hole;
  an extension plate vertically bent from the fixing plate;
  a first reflective surface protruding in a direction parallel to the fixing plate from an upper portion of an end of the extension plate, the first reflective surface being provided as a curved surface to reflect light of a first one of the plurality of light source chips toward a first area in a side direction of the vehicle;
  a second reflective surface disposed adjacent to a portion under the first reflective surface to form a wave shape and provided as a curved surface to reflect light of a second one of the plurality of light source chips toward a second area in the side direction of the vehicle, the second reflective surface protruding in a direction parallel to the fixing plate from a lower portion of the end of the extension plate; and
  a first stepped surface extending in a direction from an outer end of the first reflective surface to a rear surface of the first reflective surface.

2. The headlamp of claim 1, wherein the reflective structure further comprises:
  a third reflective surface extending in a direction from an end of the first stepped surface to a direction away from the first reflective surface, the third reflective surface being provided as a curved surface to reflect light of a third one of the plurality of light source chips toward a third area in the side direction of the vehicle;
  a second stepped surface extending in a direction from an outer end of the second reflective surface to a rear surface of the second reflective surface; and
  a fourth reflective surface extending in a direction from an end of the second stepped surface to a direction away from the second reflective surface, the fourth reflective surface being provided as a curved surface to reflect light of a fourth one of the plurality of light source chip of the light source unit toward a fourth area in the side direction of the vehicle.

3. The headlamp of claim 2, wherein the reflective structure further comprises a third stepped surface provided between the third reflective surface and the fourth reflective surface to form a stepped structure having a cross type.

4. The headlamp of claim 2, wherein
the light source unit further comprises:
connector electrically connected to the headlamp body; and
a printed circuit board (PCB) further comprises a plurality of board installation holes, the connector being installed in the PCB, and
the first one of the plurality of light source chips, the second one of the plurality of light source chips, the third one of the plurality of light source chips, and the fourth one of the plurality of light source chips are spaced apart from each other and are respectively installed in upper, lower, left, and right points of the PCB to irradiate light in a diagonal direction with respect to the first reflective surface, the second reflective surface, the third reflective surface, and the fourth reflective surface.

5. The headlamp of claim 4, wherein the light source unit further comprises:
a bracket floor, the PCB being installed on the bracket floor;
a guide partition wall provided to be integrated with a front portion of the bracket floor to support a side surface of the PCB disposed in the front portion of the bracket floor;
a plurality of heat dissipation pins provided in a rear surface of the bracket floor;
a bracket supporting part bent to be integrated with the bracket floor from an end of the bracket floor;
a through hole provided in the bracket supporting part facing the connector of the PCB; and
an accommodating groove provided in an end of the bracket supporting part to support the fixing plate and the extension plate at a position spaced apart from the through hole.

6. The headlamp of claim 2, wherein the headlamp body further comprises a bezel disposed at a front position of the reflective structure for preventing light, reflected from one of the first reflective surface, the second reflective surface, the third reflective surface, and the fourth reflective surface, from being diffused in a front direction of the headlamp body.

7. The headlamp of claim 4, wherein each of the plurality of light source chips further comprises a light-emitting diode (LED) supplied with power through the connector and the PCB.

* * * * *